US007522171B1

(12) United States Patent
Nordquist

(10) Patent No.: US 7,522,171 B1
(45) Date of Patent: Apr. 21, 2009

(54) ON-THE-FLY REORDERING OF 32-BIT PER COMPONENT TEXTURE IMAGES IN A MULTI-CYCLE DATA TRANSFER

(75) Inventor: Bryon S. Nordquist, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 433 days.

(21) Appl. No.: 11/458,952

(22) Filed: Jul. 20, 2006

Related U.S. Application Data

(63) Continuation of application No. 11/346,478, filed on Feb. 1, 2006.

(51) Int. Cl.
*G06F 13/00* (2006.01)
*G06F 7/00* (2006.01)
*G06F 15/167* (2006.01)
*G09G 5/00* (2006.01)
*G09G 5/02* (2006.01)
*G09G 5/37* (2006.01)

(52) U.S. Cl. ....................... 345/581; 345/605; 345/534; 345/541; 345/562; 382/305; 708/204; 708/206; 711/130

(58) Field of Classification Search ......... 345/581–582, 345/589–600, 605, 501–506, 536–538, 541, 345/546, 549, 552, 559, 574, 534; 382/305; 708/204, 210, 168, 206, 495, 625; 711/130, 711/147
See application file for complete search history.

(56) References Cited

U.S. PATENT DOCUMENTS

| | | | | |
|---|---|---|---|---|
| 5,631,859 | A | 5/1997 | Markstein et al. | |
| 5,987,574 | A * | 11/1999 | Paluch | 711/158 |
| 6,085,309 | A * | 7/2000 | Okamura | 712/35 |
| 6,535,898 | B1 | 3/2003 | Yuval | |
| 7,111,155 | B1 * | 9/2006 | Anderson et al. | 712/225 |
| 2007/0018919 | A1 | 1/2007 | Zavracky et al. | |
| 2007/0064462 | A1 * | 3/2007 | Matsui | 365/63 |
| 2007/0070079 | A1 * | 3/2007 | Chung et al. | 345/582 |

* cited by examiner

*Primary Examiner*—Wesner Sajous
(74) *Attorney, Agent, or Firm*—Townsend and Townsend and Crew LLP

(57) ABSTRACT

A system of processing data in a graphics processing unit having a core configured to process data in hexadecimal form and other graphics modules configured to process data in quads includes a transpose buffer with a crossbar to reorganize incoming data, several memory banks to store the reorganized data over a period of several clock cycles, and a second crossbar for reorganizing the stored data after it is read from the bank of memories in one clock cycle. The method for converting between data in hexadecimal form and data in quads includes providing data in hexadecimal form, reorganizing the data provided in hexadecimal form, storing the reorganized data in several memories, and reading several of the memory locations, which contain all of the elements of the quad, in one clock cycle.

8 Claims, 10 Drawing Sheets

ON-THE-FLY REORDERING OF 32-BIT PER COMPONENT TEXTURE IMAGES IN A MULTI-CYCLE DATA TRANSFER

CROSS-REFERENCES TO RELATED APPLICATIONS

This application is a continuation of U.S. application Ser. No. 11/346,478, filed on Feb. 1, 2006, which disclosure is incorporated by reference in its entirety for all purposes.

BACKGROUND OF THE INVENTION

The present invention relates generally to graphics data processing, and in particular to methods and systems for efficiently managing a graphics processing unit containing graphics modules configured to process data in different formats.

Graphics processing includes the manipulation, processing and displaying of images. Images are displayed on video display screens. The smallest element of a video display screen is a pixel (picture element). A screen can be broken up into many tiny dots and a pixel is one or more of those tiny dots that is treated as a unit. A pixel includes the four quantities red, green, blue, and alpha, which are retrieved by the texture module using texture coordinates (S,T,R,Q).

Graphics processing units are divided into graphics modules, which each handle different operations of the graphics processing. For example, the texture module is a module that handles textures of images. Textures are collections of color data stored in memory. The texture module reads this color data, applies a filter to the data read and returns the filtered data to a process controller. The raster operation module (ROP) handles the conversion of vector graphics images, vector fonts, or outline fonts into bitmaps for display. Graphics modules typically process data in quads. A quad is defined as a unit of 4 pixels that are arranged on a display as 2×2 pixels with 2 pixels on the top and 2 pixels on the bottom. Since one quad includes four pixels, and each pixel includes S, T, R, and Q values, one quad includes 16 scalars which are 4 S values, 4 T values, 4 R values, and 4 Q values. Quads are also data in quad form and these terms are used interchangeably. The quad is the fundamental unit at work and all of the components in the prior graphics processing unit are configured to process quads. For example, the texture module is designed to process quads because it accepts as inputs four texture coordinates (S,T,R,Q) and outputs four pixel colors each with red, green, blue and alpha values. Graphics modules are configured to process quads because they sometimes do calculations across adjacent pixels and a 2×2 arrangement of pixels is well suited for such calculations. Therefore, in order to optimize the performance of graphics modules configured to process quads, it is advantageous to process at least one quad per clock cycle so that the graphics modules can perform at least one task per clock cycle. Moreover, since prior graphics processing units include only graphics modules configured to process quads, the entire graphics processing unit can be optimized because all its modules can perform tasks within one clock cycle.

FIG. 1 is a block diagram illustrating the transfer of quads within a graphics processing unit where all of the graphics modules are configured to receive, transmit and process quads. FIG. 1 includes a core 105, a texture module 110 and a ROP module 115 exchanging quads through communication channels 120. Core 105, texture module 115, and ROP module 115 are all configured to process data in quads. Since all graphics modules within the graphics processing unit are configured to process quads, one quad can be transferred through the communication channel 120 in one clock cycle. For example core 105 transfers, in one clock cycle, to texture module 110 one quad, which contains the coordinates of 4 pixels arranged in a 2×2 format that would include $(S_0,T_0,R_0,Q_0)$, $(S_1,T_1,R_1,Q_1)$, $(S_2,T_2,R_2,Q_2)$, and $(S_3,T_3,R_3,Q_3)$. The format of this quad might be $(S_0, \ldots S_3, T_0, \ldots T_3, R_0, \ldots R_3, Q_0, \ldots Q_3,)$. The texture module 110 receives this quad in one clock cycle and, therefore, it knows the coordinates of all four pixels in one clock cycle. The texture module then reads color data, filters the color data and sends the filtered color data to core 105. If the data format were different, such as where the address of each pixel was sent in different clock cycles, then the texture module would have to wait 4 clock cycles to start processing. The filtered data produced by the texture module 110 is transmitted back to the core 105 in quads that contain color data for all 4 pixels). Since each pixel has a red, green, blue and alpha value, one quad having 4 pixels has 16 values. Since the core receives all 16 color values of one quad in one clock cycle, the core can process the quad after one clock cycle. As with the texture module 110, if the data format was different then the core 105 would have to wait 4 clock cycles to start processing.

However, in some newer systems all of the graphics modules within the graphics processing unit are not designed to handle quads. Performance problem arise when one graphics module is designed to handle quads but another graphics module is designed to handle data in a different format. This inconsistency between graphics modules within the graphics processing unit creates discontinuity in the data that is transferred. An example of this inconsistency is when in one clock cycle a first graphics module transfers to a second graphics module a set of data but the second graphics module needs different data than was transferred to begin processing. The result of this inconsistency is that the second graphics module will be slowed down because it will have to wait additional clock cycle to acquire all of the data required to perform its operation. Since slowing down one of the graphics modules can slow down the entire graphics processing unit, this inconsistency in data formats can impact the performance of the entire graphics processing unit.

Therefore what is needed a system and method for integrating into a graphics processing unit different graphics modules configured for different data formats that produce inconsistent data outputs in one clock cycle without impacting the performance of the graphics processing unit.

BRIEF SUMMARY OF THE INVENTION

Embodiments of the present invention provide techniques and systems for efficiently reorganizing and processing data in a computer system having different subsystems designed for different data formats. In one embodiment the present invention provides techniques and systems for converting between data that is in hexadecimal form and quad form.

One embodiment of the present invention is a system for converting between data in hexadecimal form and quad form in a graphics processing unit including a first transpose buffer that receives data in hexadecimal form, reorganizes and stores the data in hexadecimal form, and then sends out a the data in quad form so that one complete quad is sent out in one clock cycle. The first transpose buffer can include a first crossbar that receives and reorganizes the data in hexadecimal form, several random access memories coupled to the first crossbar where the reorganized data is stored, and a second crossbar that is coupled to the random access memories and reorganizes data that is read from the random access memories. In one embodiment the number of random access memories is four.

In another embodiment the system can further include a second transpose buffer that receives reorganizes and stores data in quad form, and then sends out data in hexadecimal form in one clock cycle. The second transpose buffer can further include a first crossbar that receives and reorganizes the data set in quad form, several random access memories coupled to the first crossbar where the reorganized data set is stored, and a second crossbar coupled to the random access memories, that reorganizes data that is read from random access memories. In another embodiment the second transpose buffer can also have four random memories.

In yet another embodiment of the present invention a graphics processing unit has a core configured to transmit data in hexadecimal form, a graphics module configured to receive the data in quad form in one clock cycle, a core interface including a first transpose buffer coupled to both the core and the graphics module. The first transpose buffer receives data in hexadecimal form from the core, then converts the received data in hexadecimal form into quad form, and transmits one quad in one clock cycle to the graphics module. The core can further include a register file configured to receive, process and transmit 16 scalars per clock cycle. The first transpose buffer can further include a first crossbar that receives from the core and reorganizes data in hexadecimal form, several random access memories coupled to the first crossbar where the reorganized data is stored, and a second crossbar that reorganizes the data after it has been read from the random access memory. In one embodiment there are four memories. Additionally the graphics module can be a texture module.

In yet another embodiment the graphics processing unit can further include a second transpose buffer that receives color data in quad form from the graphics modules and converts the color data in quad form into data in hexadecimal form to transmit to the core in one clock cycle. In this embodiment the core is further configured to receive data in hexadecimal form and the graphics module is further configured to transmit one quad in one clock cycle. The second transpose buffer can further include a first crossbar that receives from the graphics modules color data in quad form and reorganizes them, several random access memories for storing the reorganized memory, and a second crossbar for reorganizing the data after it is read from the memory. In other embodiments the number of memories can be four and/or the graphics module can be a texture module.

In yet another embodiment of the present invention, a method for converting between data in hexadecimal form and data in quad form includes the steps of providing data in hexadecimal form, reorganizing the data provided in hexadecimal form, storing the reorganized data in several memories, and reading several memory locations, which when combined store all of the elements of a quad, in one clock cycle. In another embodiment the method includes reorganizing the data read before sending it out.

The quads can include 16 values which are four texture coordinates each having values of S, T, R, and Q or the color of four pixels which can be combination of are red, green, blue, and alpha values. In one embodiment the method further includes reorganizing and storing the four values of S for a first quad in a first memory bank, reorganizing and storing the four values of S for a second quad in a second memory bank, reorganizing and storing the four values of S for a third quad in a third memory bank, and reorganizing and storing the four values of S for a fourth quad in a fourth memory bank. In another embodiment, the method includes reorganizing and storing the four values of S for a first quad in a first memory location that will be read in a first clock cycle, reorganizing and storing the four values of S for a second quad in a second memory location that will be read in a second clock cycle, reorganizing and storing the four values of S for a third quad in a third memory location that will be read in a third clock cycle, and reorganizing and storing the four values of S for a fourth quad in a fourth memory location that will be read in a fourth clock cycle.

DETAILED DESCRIPTION OF THE INVENTION

In 2 D texturing, the process of reading S and T texture coordinates from the register file takes two clock cycles: one cycle to read 16 S values, and another cycle to read 16 T values. Reading and writing the register file transfers 16 values, one value for the same register for all 16 threads. This data organization does not match other subsystems in the graphics processing unit. For example, the texture pipe receives a pixel quad (2×2 pixels) per clock and returns texel data at a rate of one quad per clock. Likewise, ROP expects one color of shaded pixels per clock. In order to covert between these different data organizations, data must be temporarily buffered and reorganized.

Embodiments of the present invention provide techniques and systems for efficiently performing this reorganization of data in different formats. The process of buffering and reorganizing data is referred to as transposing and the associated apparatus is referred to as a transpose buffer.

Figure 1:
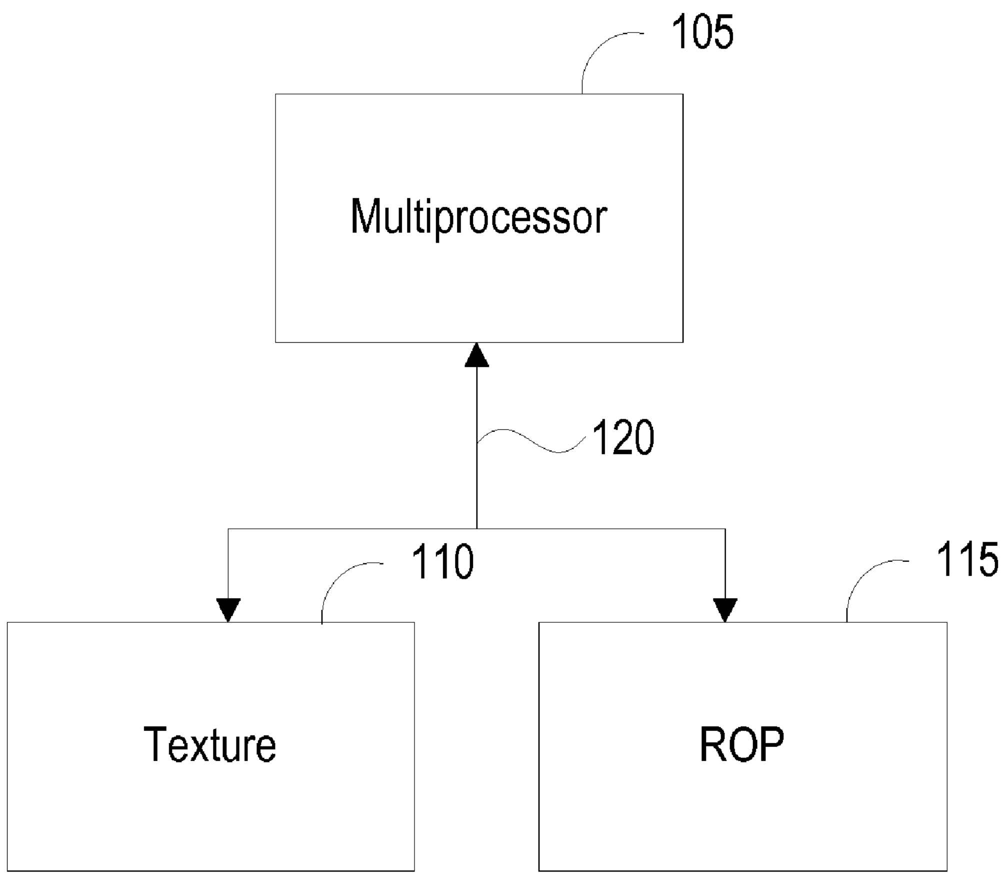
FIG. 1 (Prior Art)
FIG. 1 is a block diagram showing a prior art core communicating with a texture module and a ROP.
Figure 2:
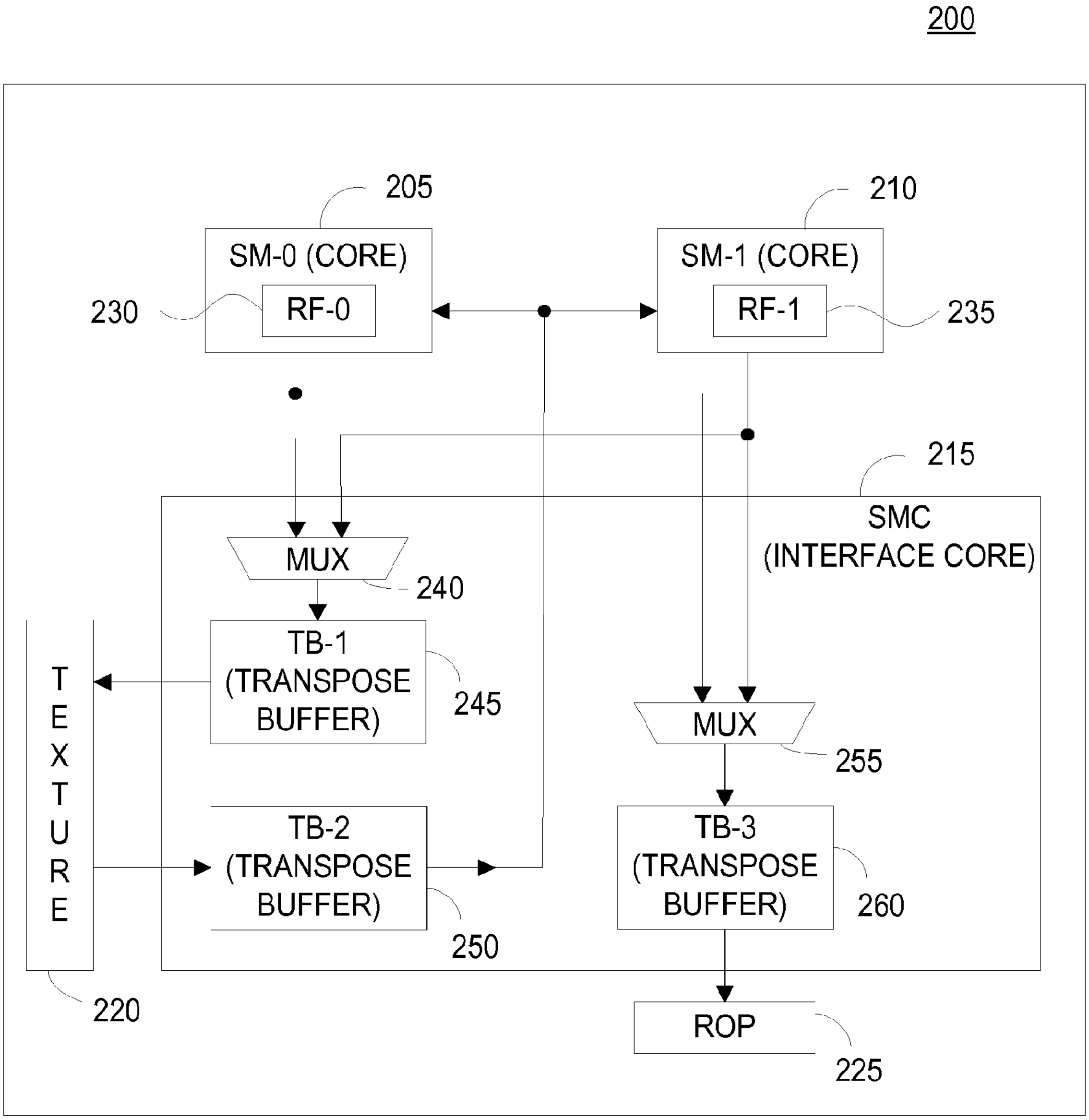
FIG. 2 is a block diagram showing a cluster 200 having a core interface including several transpose buffers in accordance with the present invention.

FIG. 2 is a block diagram showing a cluster 200 having a core interface with several transpose buffers that reorganize data between hexadecimal form and quad form, in accordance with the present invention. Cluster 200 includes a first core (SM-0) 205, a second core (SM-1) 210, a core interface 215, a texture module 220, and a raster operations module (ROP) 225. First core (SM-0) 205 further includes a first register file (RF-0) 230 while second core (SM-1) further includes a second register file (RF-1) 235. Core interface 215 further includes a multiplexer 240, a first transpose buffer (TB-1) 245, a second transpose buffer (TB-2) 250, a second multiplexer 255 and a third transpose buffer (TB-3) 260.

First core (SM-0) 205 and second core (SM-1) 210 are multi-threaded processors combined in parallel for the purpose of processing more data faster. In the preferred embodiment SM-0 205 and SM-1 210 each have 16 arithmetic logic units (ALU) so that each core 205 and 210 can execute one instruction for 16 threads in parallel. Since each core 205 and 210 has 16 ALUs, the combination can process 32 operations in parallel. Both SM-0 205 and SM-1 210 have register files RF-0 230 and RF-1 235 respectively which are used to supply ALU with data. Register files RF-0 230 and RF-1 235 each provide 16 scalar values per clock. Moreover, each of the 16 scalars represents the same scalar in each of the 16 individual threads of execution. Cores 205 and 210 can be SIMD processors which execute instructions for 16 threads in parallel. This hexadecathread (HDT) is the basic unit of work for cores 205 and 210. The register file in the core is organized such that one entry in the register file contains 16 registers, one register per thread.

Core interface 215 uses a multiplexer 240, a first transpose buffer (TB-1) 245, a second transpose buffer (TB-2) 250, a second multiplexer 255 and a third transpose buffer (TB-3) 260 to process and route data between SM-0 205, SM-1 210, texture module 220 and ROP 225. Additionally, core interface 215 acts as an intermediary between the two cores 205, 210 and any external memory, such as memory in the texture module 220. Core interface 215 controls and manages the access that SM-0 and SM-1 have to external memory by collecting texture coordinates, transposing those texture coordinates, and sending those texture coordinates to the texture module 220 The transpose buffers are implemented with multiple banks of RAMs. The transpose operation is achieved by writing the incoming data across all banks of RAM in the same entry, and then reading the outgoing data from all banks of RAM at staggered entries. Multiplexers 240 and 255 can be used at both the inputs and outputs of the RAM banks to align the data properly. Further details of how the transpose buffer is used are given below with reference to FIGS. 3-6.

When the cores SM-0 205 and SM-1 210 process data, they first request texture data having texture coordinates S,T,R,Q by sending the S,T,R, and Q coordinates from their respective register files RF-0 and RF-1 to the texture module 210 through the first transpose buffer TB-1 245. The first transpose buffer TB-1 245 reorganizes the data from the register files so that it is in 2×2 quad form that the texture module is configured to process. Further details of the data transform are given below with reference to FIG. 3. Additionally the multiplexer 240 can be used prior to the first transpose buffer 245 to combine data from the first register file RF-0, 230 of the first core SM-0 205 and the second register file RF-1, 235 of the second core SM-1, 210. The first transpose buffer (TB-1) 245 transposes the S,T,R, and Q texture coordinates into 2×2 quad form and transmits the transposed S,T,R, and Q texture coordinates to the texture module 220 so that texture module 220 can process the data. The texture module 220 then retrieves color data associated with the texture coordinates, processes the retrieved color data and transmits the color data associated with the S,T,R, and Q texture coordinates to second transpose buffer (TB-2) 250. The color associated with each S,T,R,Q texture coordinate has four values corresponding to red, green, blue, and alpha. After the texture module 220 returns the colors associated with the texture coordinates, the second transpose buffer (TB-2) 250 of core interface 215 transposes the color data and sends the transposed color data to the cores 205 and 210. Second transpose buffer TB-2 250 converts the color data format from the 2×2 quad used by the texture module 220 into 16 thread data form (hexadecathread) accepted by the first register file RF-0 and the second register file RF-1 and used by the cores. The second multiplexer 255 can be used prior to the third transpose buffer 260 to combine data from the first register file RF-0, 230 of the first core SM-0 205 and the second register file RF-1, 235 of the second core SM-1, 210. The third transpose buffer TB-3 260 converts data from the register files RF-0 and RF-1, which has gone through the second multiplexer 255 and is in 16 thread data format into 2×2 quad format that the raster operations module (ROP) 225 is configured to process. The transpose buffers 245, 250, and 260 temporarily hold data and reorganize it.

Texture module 220 can include a look up table with the color values of all the different S,T,R, and Q texture coordinates. In one embodiment having a two dimensional texture image S represents the horizontal coordinates of a texture image and T represents the vertical coordinates of the texture image. If the texture image is three dimensional and is viewed as a stack of two dimensional texture images, R represents the depth of the texture image and can be seen as a slice of the texture image. If the texture images are an array of three dimensional texture images then Q represents the coordinates of one of the three dimensional textures from the set. The color values of each S,T,R,Q texture coordinate include red, green, blue, and alpha. Core interface 215 can further include a pixel shader which generates a final pixel color which is then transmitted to the raster operations module (ROP) 225. The pixel shader can perform additional processing of the texture data before it is sent to ROP 225. ROP 225 then integrates or blends the final pixel color from the pixel shader received from the core interface 215 as is further discussed below. Since ROP 225 receives data that have been converted by the third transpose buffer TB-3 260, from 16 thread form into 2×2 quads, ROP 225 is able to process the data seamlessly.

Core interface 215 collects instructions from the cores 205 and 210 in 16 thread form, converts those S,T,R,Q texture coordinates into 2×2 quads, sends the transposed texture coordinates to the texture module 220, then receives color values for the S,T,R,Q texture coordinates from the texture module 220 in 2×2 quads, transposes the color data into 16 thread form and transmits that transformed data to cores 205 and 210. Similarly the third transpose buffer TB-3 260 transposes data from the cores 205 and 210 that are in 16 thread form into 2×2 quads to send to ROP 225 for further processing. The direction of this data flow is shown by the arrows in FIG. 2. Although not shown in the figures, multiple clusters can be assembled together to run in parallel to improve the performance of the entire computer system, as further described below with reference to FIG. 4.

Figure 3:
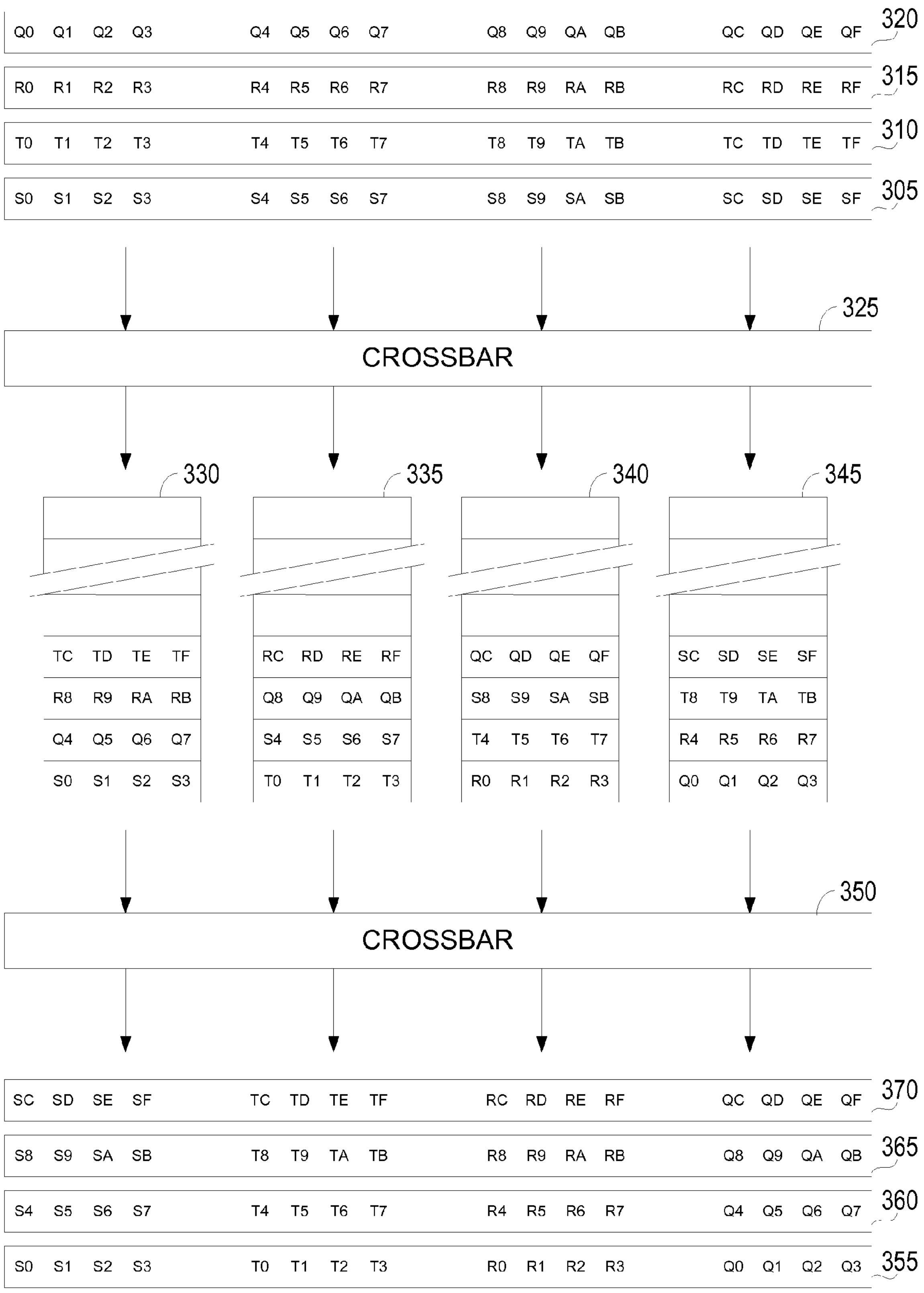
FIG. 3 is an illustration showing the reorganization and storing of 16 scalar hexadecimal data generated by a register file in a core as it is converted into quads used by a texture module, in accordance with one embodiment of the present invention.

FIG. 3 is an illustration showing how the texture coordinates S,T,R, and Q, which are generated by the cores 205 and 210, are transposed by the first transpose buffer TB-1 245, in accordance with one embodiment of the present invention.

FIG. 3 includes a first register file output 305, a second register file output 310, a third register file output 315, a fourth register file output 320, a first crossbar 325, four random access memories (RAM) 330, 335, 340, and 345, a second crossbar 350, a first transpose buffer output 355, a second transpose buffer output 360, a third transpose buffer output 365, and a fourth transpose buffer output 370. The cores 205 and 210 generate S, T, R, and Q texture coordinates that are hexadecimal data which are the 16 scalars shown in each of the register file outputs 305, 310, 315, and 320, respectfully.

First register file output 305, second register file output 310, third register file output 315, and fourth register file output 320 are arranged vertically according to time so that the register file outputs are generated sequentially with the first register file output being generated first by RF-0 or RF-1 and the fourth register file output being generated last. The first register file output 305 includes 16 S values $S_0, S_1, \ldots, S_{15}$, the second register file output 310 includes 16 T values $T_0, T_1, \ldots, T_{15}$, the third register file output 315 includes 16 R values $R_0, R_1, \ldots, R_{15}$, and the fourth register file output 320 includes 16 Q values $Q_0, Q_1, \ldots, Q_{15}$. The S, T, R and Q represent the texture coordinates of four pixels. Therefore, in this embodiment RF-0 and RF-1 of the cores sequentially output 16 S texture coordinates, then 16 T texture coordinates, then 16 R texture coordinates, and then 16 Q texture coordinates so that in one clock cycle a quarter of the data for four quads is outputted but in four clock cycles four complete quads are outputted.

The first crossbar 325 and second crossbar 350 are both switching devices that keep N nodes communicating at full speed with N other nodes. In one embodiment, first cross bar 325 and second crossbar 350 are both 16×16 switches that keep 16 nodes communicating at full speed with 16 other nodes. The four random access memories (RAM) 330, 335, 340, and 345 represent different memory banks with each bank having its own unique write port and read port so that in a single clock cycle four different indices across the four different RAMS can be accessed. RAMs 330, 335, 340, and 345 are used to store the S, T, Q, and R values after they have been transposed by the first crossbar 325.

The entries found in first transpose buffer output 355, second transpose buffer output 360, third transpose buffer output 365, and fourth transpose buffer output 370 are also arranged vertically according to time so that the transpose buffer outputs are generated sequentially with the first transpose buffer output 355 being generated first by the second crossbar 350 and the fourth transpose buffer output 370 being generated last. The first transpose buffer output 355 includes the 16 values $S_0, \ldots S_3, T_0, \ldots T_3, R_0, \ldots R_3, Q_0, \ldots Q_3$, the second transpose buffer output 360 includes the 16 values $S_4, \ldots S_7, T_4, \ldots T_7, R_4, \ldots R_7, Q_4, \ldots Q_7$, the third transpose buffer output 365 includes the 16 values $S_8, \ldots S_B, T_8, \ldots T_B, R_8, \ldots R_B, Q_8, \ldots Q_B$, and the fourth transpose buffer output 370 includes the 16 values $S_C, \ldots S_F, T_C, \ldots T_F, R_C, \ldots R_F, Q_C, \ldots Q_F$. In one embodiment, the S, T, R and Q represent texture coordinates that the texture module uses to retrieve red, green, blue, and alpha values. Since the first transpose buffer output 355 includes the 16 values $S_0, \ldots S_3, T_0, \ldots T_3, R_0, \ldots R_3, Q_0, \ldots Q_3$, a first complete quad is outputted to the texture module 220 during the first clock cycle. Similarly, the second transpose buffer output 360 is a second quad which is outputted to the texture module 220 in a single clock cycle, the third transpose buffer output 365 is a third quad which is outputted to the texture module 220 in a single clock cycle, and the fourth transpose buffer output 370 is a fourth quad which is outputted to the texture module 220 in single clock cycle. Since the texture module 220 receives a complete quad during the first clock cycle, it can start processing immediately after the first clock cycle.

In FIG. 3 the $S_0, S_1, \ldots, S_{15}$, data from the first register file output 305 goes into crossbar 325 and is then reorganized and routed so that $S_0$ through $S_3$ is stored in the first row of the first RAM 330, $S_4$ through $S_7$ is stored in the second row of the second RAM 335, $S_8$ through $S_B$ is stored in the third row of the third RAM 340, and $S_C$ through $S_F$ is stored in the fourth row of the fourth RAM 345. The $T_0, T_1, \ldots, T_{15}$, data from the second register file output 310 goes into crossbar 325 and is then reorganized and routed so that $T_0$ through $T_3$ is stored in the first row of the second RAM 335, $T_4$ through $T_7$ is stored in the second row of the third RAM 340, $T_8$ through $T_B$ is stored in the third row of the fourth RAM 345, and $T_C$ through $T_F$ is stored in the fourth row of the first RAM 330. The $R_0, R_1, \ldots, R_{15}$, data from the third register file output 315 goes into crossbar 325 and is then reorganized and routed so that $R_0$ through $R_3$ is stored in the first row of the third RAM 340, $R_4$ through $R_7$ is stored in the second row of the fourth RAM 345, $R_8$ through $R_B$ is stored in the third row of the first RAM 330, and $R_C$ through $R_F$ is stored in the fourth row of the second RAM 335. The $Q_0, Q_1, \ldots, Q_{15}$, data from the fourth register file output 320 goes into crossbar 325 and is then reorganized and routed so that $Q_0$ through $Q_3$ is stored in the first row of the fourth RAM 345, $Q_4$ through $Q_7$ is stored in the second row of the first RAM 330, $Q_8$ through $Q_B$ is stored in the third row of the second RAM 335, and $Q_C$ through $Q_F$ is stored in the fourth row of the third RAM 340. The S, T, R, and Q data is organized in this manner because only one index can be read at a time and the bottom row of RAMs 330, 335, 340, and 345 contain all the 0 through 3 data, whereas the second row of RAMs 330, 335, 340, and 345 contain all the 4 through 7 data, whereas the third row of RAMs 330, 335, 340, and 345 contain all the 8 through B data, and whereas the fourth row of RAMs 330, 335, 340, and 345 contain all the C through F data.

In one embodiment, the second crossbar 350 is used to appropriately reorganize and route the data so that the final format of a quad is to have all of the S's in the left most channel, all of the T's in the second channel, all of the R's in the third channel, and all of the Q's in the fourth right most channel. This quad format is preferable because it avoids bank conflicts. Avoiding bank conflicts can improve the performance of the system because cycles are needed to address bank conflicts and if the number of bank conflicts is reduced, then so is the number of cycles. The second crossbar outputs the first transpose buffer output 355, the second transpose buffer output 360, the third transpose buffer output 365, and the fourth transpose buffer output 370. The first transpose buffer output 355 is generated by reading the first row of the four RAMs 330, 335, 340, 345, reorganizing the order with the second crossbar 350 and outputting the data so that first RAM 330 is first, second RAM 335 is second, third RAM 340 is third, and fourth RAM 345 is fourth. The second transpose buffer output 360 is generated by reading the second row of the four RAMs 330, 335, 340, 345, reorganizing the order with the second crossbar 350 and outputting the data so that second RAM 335 is first, third RAM 340 is second, fourth RAM 345 is third, and first RAM 330 is fourth. The third transpose buffer output 365 is generated by reading the third row of the four RAMs 330, 335, 340, 345, reorganizing the order with the second crossbar 350 and outputting the data so that third RAM 340 is first, fourth RAM 345 is second, first RAM 330 is third, and second RAM 335 is fourth. The fourth transpose buffer output 370 is generated by reading the fourth row of the four RAMs 330, 335, 340, 345, reorganizing the order with the second crossbar 350 and outputting the data so that fourth RAM 345 is first, first RAM 330 is second, second RAM 335 is third, and third RAM 340 is fourth.

The S, T, R, and Q texture coordinates in the first transpose buffer output 355, second transpose buffer output 360, third transpose buffer output 365, and fourth transpose buffer output 370 are arranged as quads because for each clock cycle all of the data for an entire quad is obtained. The data making up a first quad is $S_0, \ldots S_3, T_0, \ldots T_3, R_0, \ldots R_3$, and $Q_0, \ldots Q_3$. Similarly, the data making up a second quad is $S_4, \ldots S_7, T_4, \ldots T_7, R_4, \ldots R_7$, and $Q_4, \ldots Q_7$, the data making up a third quad is $S_8, \ldots S_B, T_8, \ldots T_B, R_8, \ldots R_B$, and $Q_8, \ldots Q_B$, and the data making up a fourth quad is $S_C, \ldots S_F, T_C, \ldots T_F, R_C, \ldots R_F$, and $Q_C, \ldots Q_F$. One clock cycle outputs one entire quad because a clock cycle will output either $(S_0, \ldots S_3, T_0, \ldots T_3, R_0, \ldots R_3, Q_0, \ldots Q_3)$, or $(S_4, \ldots S_7, T_4 \ldots T_7, R_4 \ldots R_7, Q_4, \ldots Q_7)$, or $(S_8, \ldots S_B, T_8 \ldots T_B, R_8 \ldots R_B, Q_8, \ldots Q_B)$, or $(S_C, \ldots S_F, T_C, \ldots T_F, R_C, \ldots R_F, Q_c, \ldots Q_F)$. Therefore the transpose buffer has transposed the data format that originally required four clock cycles to get one entire quad into a data format wherein an entire quad can be determined in one clock cycle.

The advantage of having quads is that many of the other graphics modules such as the texture module 220 and the ROP module 225 use quads. Since most graphics modules are designed to process quads, quads are considered to be the natural work unit for graphics processors. For example, the texture module 220 calculates across a quad so it is advantages to have an entire quad in one clock cycle. An example of a calculation that can be done in the texture module 220 is a derivative which measures the difference in S across a quad. Similarly it is advantageous for the ROP module 225 to receive data in quads because ROP module 225 is designed to process quads. Another example of a mathematical calculation performed is blending the alpha values, which represent transparency, with the color values, which represent red, green and blue.

Figure 4:
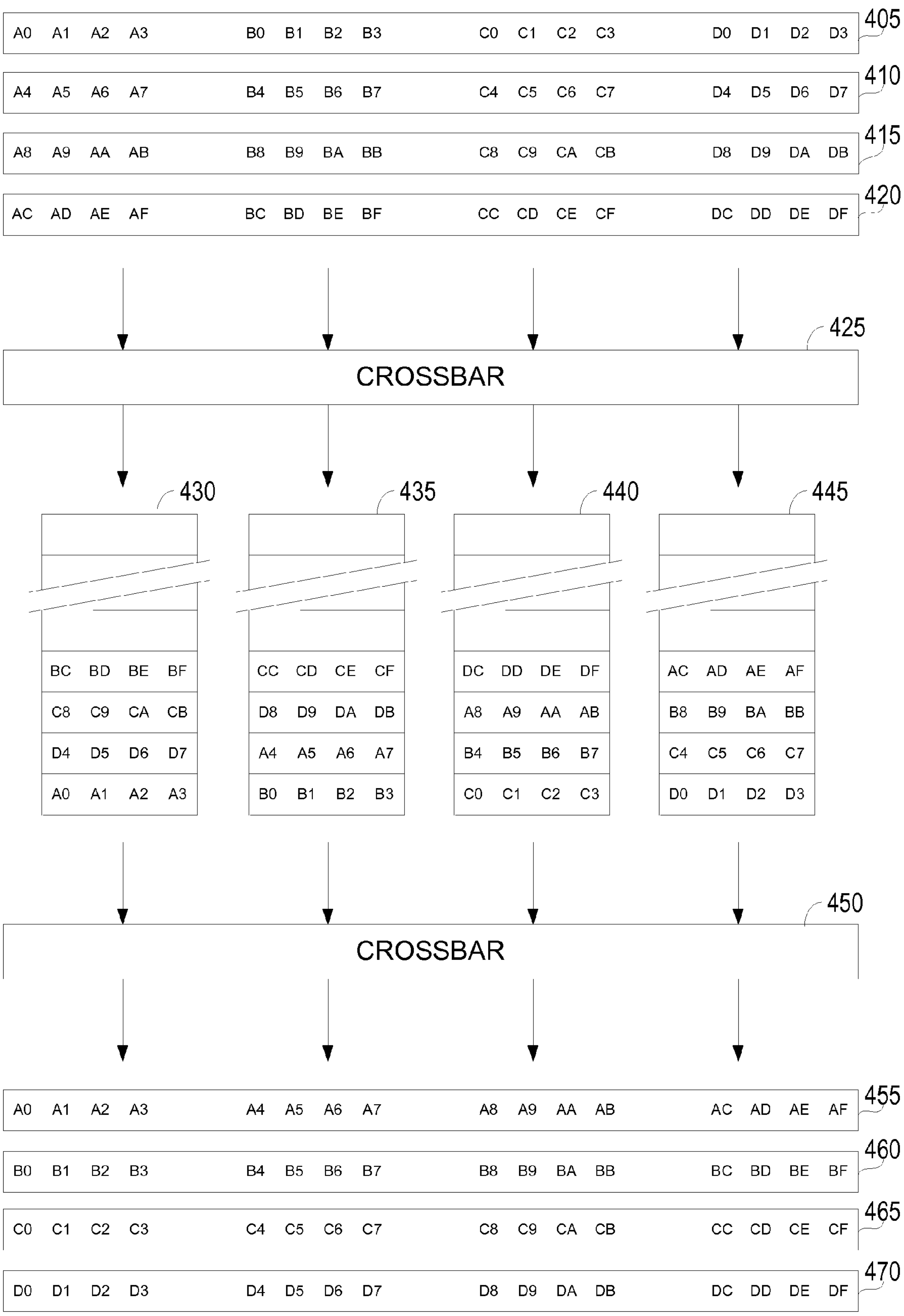
FIG. 4 is an illustration showing the reverse of FIG. 3, where the color values of the texture coordinates, retrieved by the texture module are converted into 16 scalar hexadecimal data used by a register file, in accordance with one embodiment of the present invention.

FIG. 4 is an illustration showing the reverse process of the transpose buffer shown in FIG. 3, wherein incoming color data in quad form is transposed to 16 bit scalar numbers preferred by cores 205 and 210. FIG. 4 includes a first texture module output 405, a second texture module output 410, a third texture module output 415, a fourth texture module output 420, a first crossbar 425, four random access memories (RAM) 430, 435, 440, and 445, a second crossbar 450, and first transpose buffer output 455, a second transpose buffer output 460, a third transpose buffer output 465, and a fourth transpose buffer output 470. This process of transforming incoming color data in quad form into 16 bit scalar numbers is performed by the second transpose buffer (TB-2) 250 after it receives color data from the texture module 220. Since texture module 220 outputs the color data red, green, blue, and alpha associated with texture coordinates, the second transpose buffer TB-2 250 transposes color values. In this embodiment, A represents the color red, B represents the color green, C represents the color blue, and D represents alpha. FIG. 4 is similar to FIG. 3 except that it is reversed in time.

In FIG. 4, the first texture module output 405, which includes four red values $A_0, \ldots A_3$, four green values $B_0, \ldots B_3$, four blue values, $C_0, \ldots C_3$, and four alpha $D_0, \ldots D_3$ that describes the color of one pixel, is transposed and stored in RAMS 430, 435, 440, and 445 in one clock cycle. In a second clock cycle, the second texture module output 410, which includes four red values $A_4, \ldots A_7$, four green values $B_4, \ldots B_7$, four blue values, $C_4, \ldots C_7$, and four alpha $D_4, \ldots D_7$ that describes the color of a second pixel, is also transposed and stored in RAMS 430, 435, 440, and 445. In a third clock cycle, the third texture module output 415, which includes four red values $A_8, \ldots A_B$, four green values $B_8, \ldots B_B$, four blue values, $C_8, \ldots C_B$, and four alpha $D_8, \ldots D_B$ that describes the color of a third pixel, is also transposed and stored in RAMS 430, 435, 440, and 445. Finally, in a fourth clock cycle, the fourth texture module output 420, which includes four red values $A_C, \ldots A_F$, four green values $B_C, \ldots B_F$, four blue values, $C_C, \ldots C_F$, and four alpha $D_C, \ldots D_F$ that describes the color of a fourth pixel, is also transposed and stored in RAMS 430, 435, 440, and 445.

After four clock cycles all of the color data describing the four pixels is stored in RAMS 430, 435, 440, and 445. This color data is then outputted in hexadecimal form through the second crossbar 450 as first transpose buffer output 455, second transpose buffer output 460, third transpose buffer output 465, and fourth transpose buffer output 470. The first transpose buffer output 455 is outputted in one clock cycle and includes all 16 red values $A_0, \ldots A_F$, for all the four pixels. The second transpose buffer output 460 is outputted in a second clock cycle and includes all 16 green values $B_0, \ldots B_F$, for all the four pixels. The third transpose buffer output 465 is outputted in a third clock cycle and includes all 16 blue values $C_0, \ldots C_F$, for all the four pixels. The fourth transpose buffer output 470 is outputted in a fourth clock cycle and includes all 16 alpha values $D_0, \ldots D_F$, for all the four pixels. The cores 205 and 210 are designed to accept this format because the register files RF-0 230 and RF-1 235 are configured to process data in batches of 16.

Although first transpose buffer 245 and third transpose buffer 260 can be the same while second transpose buffer 250 is the inverse of first transpose buffer 245, they do not have to be the same and other configurations are possible. Some examples of when the transpose buffers can be different are when the ROP 225 or texture buffers 220 require different precision color data. For example, a transpose buffer that is configured to handle very high precision color data is different than a transfer buffer configured to handle low precision color data. The transpose buffer configured to process high precision color data processes register file outputs that are 32 bit floating point values whereas the transpose buffer configured to process low precision color data processes register files that are 8 bits. Therefore, although the operations of both these transpose buffers are the same, the two transpose buffers are configured to process different data types and their respective RAM and crossbars configurations could be different.

Another example illustrating when the second transpose buffer 250 can accept data at different precisions is when the texture image format is 32 bits per component (e.g. floating point) but the texture module 220 and the second transpose buffer (TB-2) 250 are optimized to transfer texture data at 16 bits per component. In this scenario, since there are not enough wires between the texture module 220 and the core interface 215, data is transferred at half speed, which is 2 components per quad per cycle, and TB-2 250 stores twice as much component data requiring twice as much memory. In one embodiment two banks of second transpose buffer TB-2 250 are coupled to hold all of the data utilizing twice as many RAM entries. For example, in this embodiment $A_0, \ldots, A_3$ would occupy two banks instead of one bank. In this embodiment since multiple entries are written to a single RAM it takes twice as many cycles, and therefore twice as much time, to read out the data. However, despite the fact that it takes twice as long to read out the data from the second transpose buffer, the second transpose buffer is not a bottleneck in this embodiment because the texture module 220 also runs at half speed.

In another embodiment, the cluster 200 can be configured so that the third transpose buffer (TB-3) 260 can accept data at different precisions. For example if TB-3 260 is configured to process 8-bit component data and if the ROP 225 is configured to receive data that is 16 bit component, then the TB-3 260 will run at half speed and therefore use twice as many entries. Similarly, if ROP 225 is configured to receive data that is 32 bit, then the TB-3 260 runs at quarter speed and uses four times as many entries.

Figure 5:
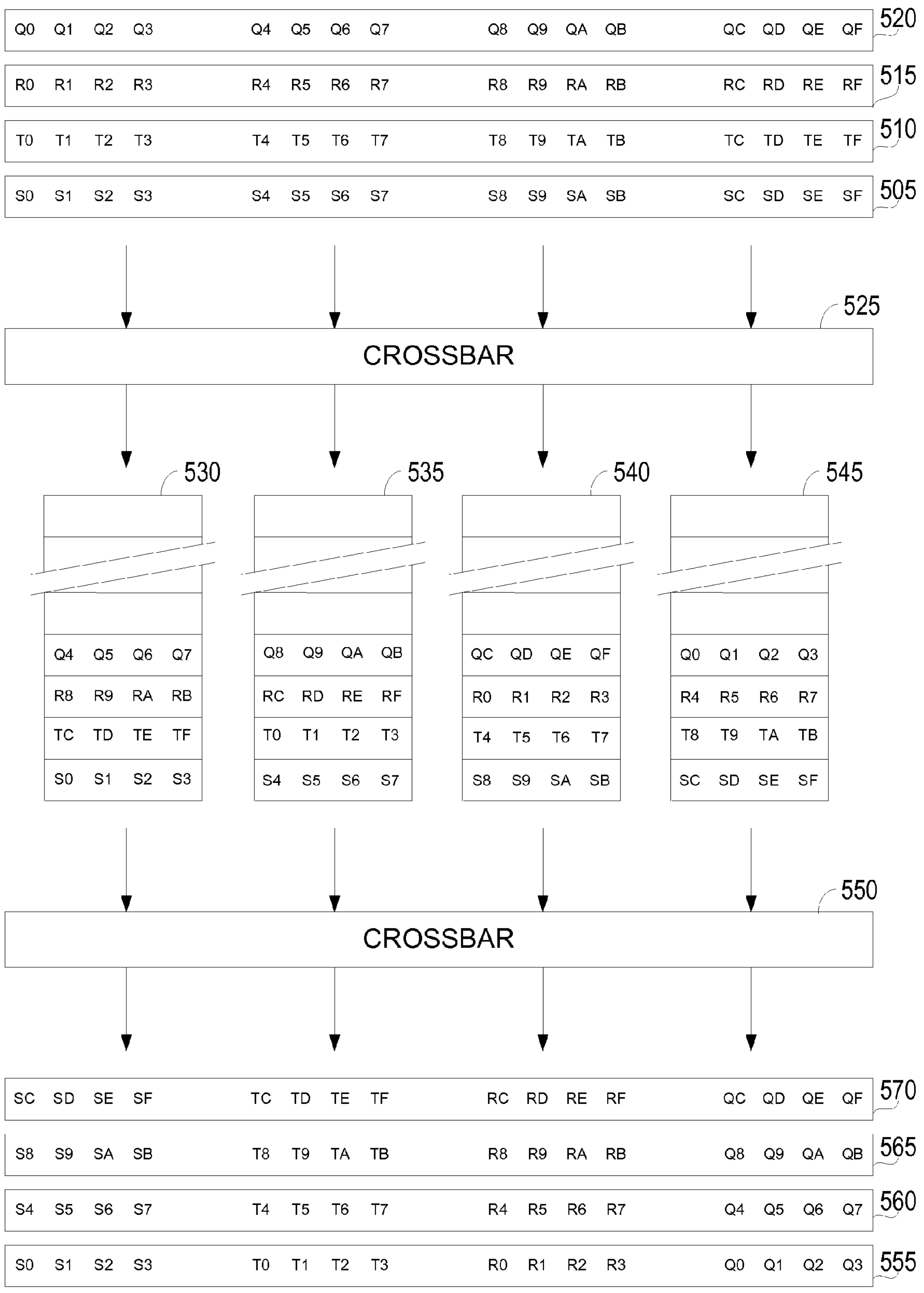
FIG. 5 is an illustration showing the reorganization and storing of 16 scalar hexadecimal data generated by a register file in a core as it is converted into quads used by a texture module, in accordance with another embodiment of the present invention.

FIG. 5 is an illustration showing a second embodiment of how the texture coordinates generated by the cores 205 and 210 are transposed by the first transpose buffer TB-1 245, in accordance with another embodiment of the invention. FIG. 5 includes a first register file output 505, a second register file output 510, a third register file output 515, a fourth register file output 520, a first crossbar 525, four random access memories (RAM) 530, 535, 540, and 545, a second crossbar 550, and first transpose buffer output 555, a second transpose buffer output 560, a third transpose buffer output 565, and a fourth transpose buffer output 570. The cores 205 and 210 generate S, T, R, and Q values that are hexadecimal data which is the 16 scalars shown in each of the register file outputs 505, 510, 515, and 520.

In FIG. 5 the $S_0, S_1, \ldots, S_{15}$, data from the first register file output 505 goes into crossbar 525 and is then reorganized and routed so that $S_0$ through $S_3$ is stored in the first row of the first RAM 530, $S_4$ through $S_7$ is stored in the first row of the second RAM 535, $S_8$ through $S_B$ is stored in the first row of the third RAM 540, and $S_C$ through $S_F$ is stored in the first row of the fourth RAM 545. The $T_0, T_1, \ldots, T_{15}$, data from the second register file output 510 goes into crossbar 525 and is then reorganized and routed so that $T_0$ through $T_3$ is stored in the second row of the second RAM 535, $T_4$ through $T_7$ is stored in the second row of the third RAM 540, $T_8$ through $T_B$ is stored in the second row of the fourth RAM 545, and $T_C$ through $T_F$ is stored in the second row of the first RAM 530. The $R_0, R_1, \ldots, R_{15}$, data from the third register file output 515 goes into crossbar 525 and is then reorganized and routed so that $R_0$ through $R_3$ is stored in the third row of the third RAM 540, $R_4$ through $R_7$ is stored in the third row of the fourth RAM 545, $R_8$ through $R_B$ is stored in the third row of the first RAM 530, and $R_C$ through $R_F$ is stored in the third row of the second RAM 535. The $Q_0, Q_1, \ldots, Q_{15}$, data from the fourth register file output 520 goes into crossbar 525 and is then reorganized and routed so that $Q_0$ through $Q_3$ is stored in the fourth row of the fourth RAM 545, $Q_4$ through $Q_7$ is stored in the fourth row of the first RAM 530, $Q_8$ through $Q_B$ is stored in the fourth row of the second RAM 535, and $Q_C$ through $Q_F$ is stored in the fourth row of the third RAM 540. The S, T, R, and Q data is organized in this manner because only one index can be read at a time and the different RAMs 530, 535, 540, and 545 each only contain one set of 0 through 3 data, one set of 4 through 7 data, one set of 8 through B data, and one set of C through F data. Specifically, the first RAM 530 only contains $S_0, \ldots, S_3, T_C, \ldots, T_F, R_8, \ldots, R_B, Q_4, \ldots, Q_7$, the second RAM 535 only contains $S_4, \ldots, S_7, T_0, \ldots, T_3, R_C, \ldots, R_F, Q_8, \ldots, Q_B$, the third RAM 540 only contains $S_8, \ldots, S_B, T_4, \ldots, T_7, R_0, \ldots, R_3, Q_C, \ldots, Q_F$, the fourth RAM 545 only contains $S_C, \ldots, S_F, T_8, \ldots, T_B, R_4, \ldots, R_7, Q_0, \ldots Q_3$.

As discussed above with reference to FIG. 3, since the quads format is to have all of the S's in the left most channel, all of the T's in the second channel, all of the R's in the third channel, and all of the Q's in the fourth right most channel, the second crossbar 550 is used to reorganize and appropriately route the data. The second crossbar 550 outputs the first transpose buffer output 555, the second transpose buffer output 560, the third transpose buffer output 565, and the fourth transpose buffer output 570. In order to get quads, the RAMs 530, 535, 540, and 545 are read in staggered order and then sent through the second crossbar 550, which rearranges the order. Specifically, to get the first transpose buffer output 555, in one clock cycle the first row of the first RAM 530 is read first, the second row of the second RAM 535 is read second, the third row of the third RAM 540 is read third, and the fourth row of the fourth RAM 545 is read fourth in this staggered manner to get $S_0, \ldots S_3, T_0, \ldots, T_3, R_0, \ldots, R_3, Q_0, \ldots, Q_3$. In order to get the second transpose buffer output 560, in one clock cycle the fourth row of the first RAM 530 is read first, the first row of the second RAM 535 is read second, the second row of the third RAM 540 is read third, and the third row of the fourth RAM 545 is read fourth in this staggered manner to get $Q_4, \ldots, Q_7, S_4, \ldots S_7, T_4, \ldots, T_7, R_4, \ldots, R_7$. The second crossbar 550 then switches this data around to read $S_4, \ldots S_7, T_4, \ldots, T_7, R_4, \ldots, R_7, Q_4, \ldots, Q_7$. In order to get the third transpose buffer output 565, in one clock cycle the third row of the first RAM 530 is read first, the fourth row of the second RAM 535 is read second, the first row of the third RAM 540 is read third, and the second row of the fourth RAM 545 is read fourth in this staggered manner to get $R_8, \ldots, R_B, Q_8, \ldots, Q_B, S_8, \ldots S_B, T_8, \ldots, T_B$. The second crossbar 550 then switches this data around to read $S_8, \ldots S_B, T_8, \ldots, T_B, R_8, \ldots, R_B, Q_8, \ldots, Q_B$. In order to get the fourth transpose buffer output 570, in one clock cycle the second row of the first RAM 530 is read first, the third row of the second RAM 535 is read second, the fourth row of the third RAM 540 is read third, and the first row of the fourth RAM 545 is read fourth in this staggered manner to get $T_C, \ldots, T_F, R_C, \ldots, R_F, Q_C, \ldots, Q_F, S_C, \ldots S_F$. The second crossbar 550 then switches this data around to read $S_C, \ldots S_F, T_C, \ldots, T_F, R_C, \ldots, R_F, Q_C, \ldots, Q_F$.

Figure 6:
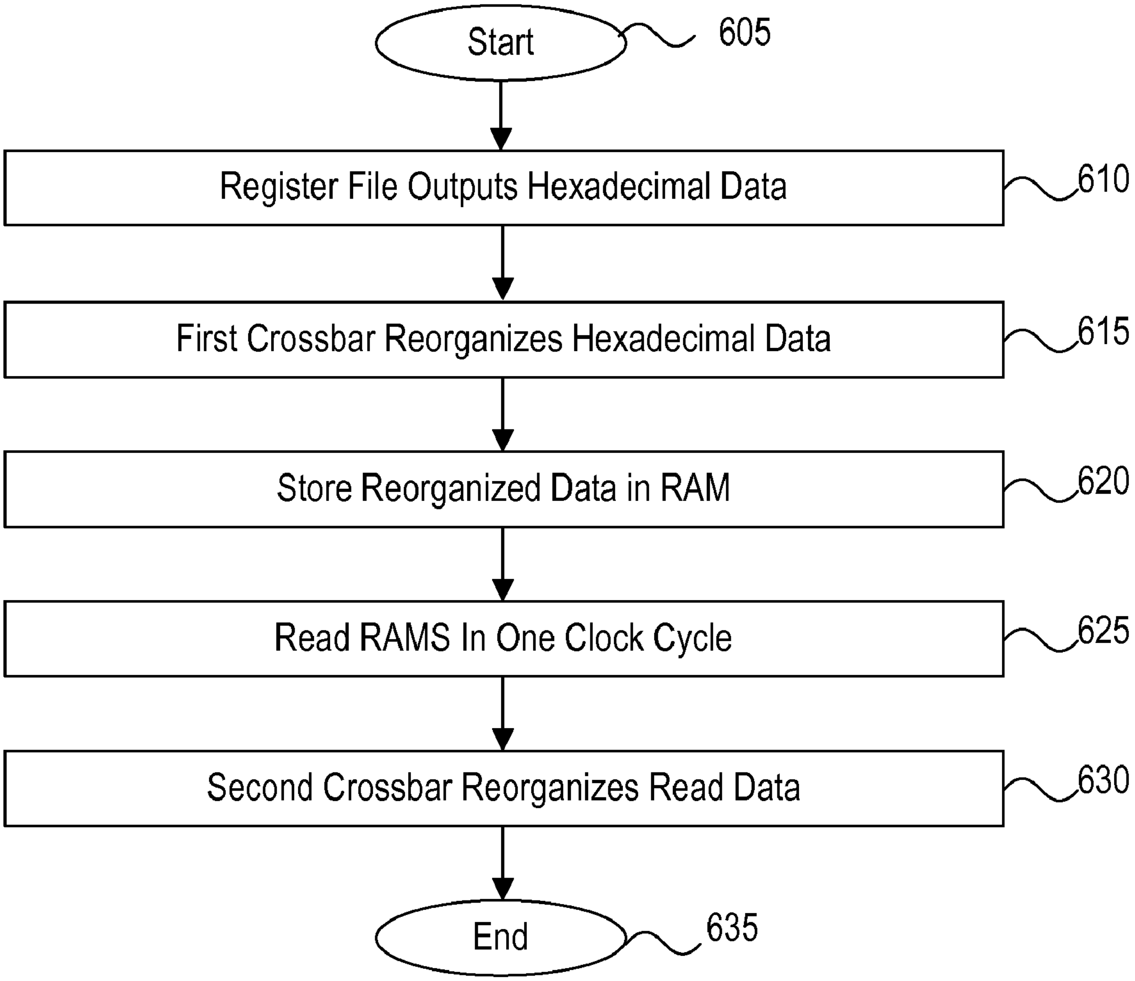
FIG. 6 is a flowchart showing the steps used to convert hexadecimal data used by the core into a quad used by other units in a graphics processing unit.

FIG. 6 is a flowchart showing the steps used to convert hexadecimal data used by the cores 205 and 210 into quads used by other graphics modules in a graphics processing unit. The process starts in step 605 when the system is configured to have register files 230 and 235 that output hexadecimal data in 16 scalar format and to have other devices such as texture modules 220 or ROP modules 225 which are configured to input quads. In step 610 the register files 230 and 235 output hexadecimal data corresponding to texture coordinates S,T,R, and Q. In one clock cycle the register file 230 and 235 outputs 16 scalar values all S values, all T values, all R values, or all Q values. Next in step 615 the outputted S,T,R, or Q values are sent through a first crossbar so that they are reorganized in the order that they are to be stored in RAM. In step 620, the reorganized data is stored in the RAM according to an indexing scheme that stores the 16 scalar values as described above with reference to FIGS. 3 and 5. After four clock cycles the RAMs, which are populated as illustrated in FIGS. 3 and 5, are read. Next in step 625 all of the RAMs are read in one clock cycle. After the RAM's are read in one clock cycle the data is sent through a second crossbar in step 630 which again reorganizes the data so that it is in quad format. Finally in step 635, the process ends when all of the data has been converted from hexadecimal data to quads and the data is transmitted to either the texture module 220 or the ROP module 225.

Figure 7:
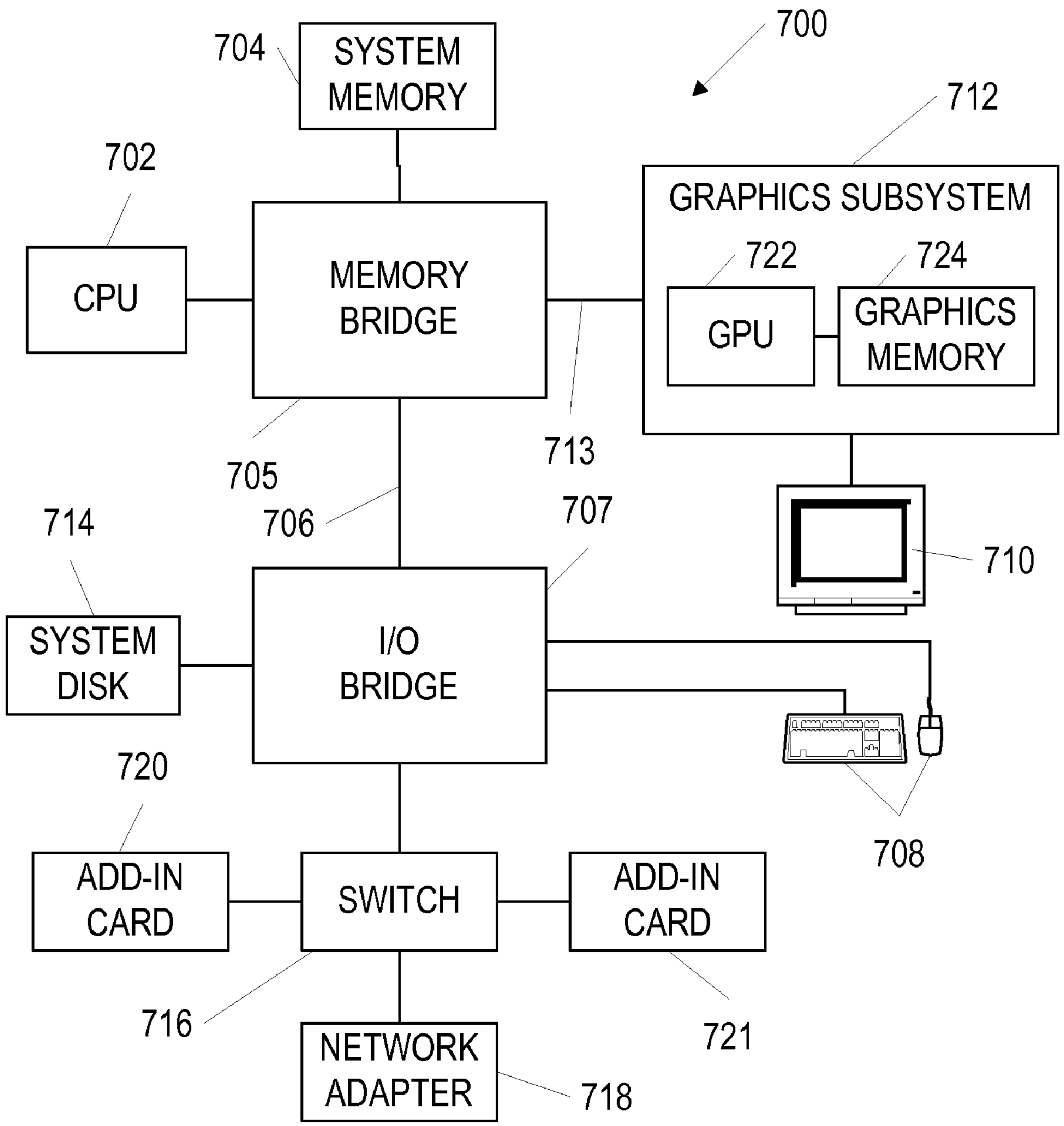
FIG. 7 is an illustrative block diagram showing a computer system having a graphics processing unit incorporating the core interface of FIG. 2, in accordance with one embodiment of the present invention.

FIG. 7 is an illustrative block diagram showing a computer system 700 having a graphics processing unit incorporating the core interface of FIG. 2, in accordance with one embodiment of the invention. Computer system 700 includes a central processing unit (CPU) 702 and a system memory 704 communicating via a bus path that includes a memory bridge 705. Memory bridge 705 is connected via a bus path 706 to an I/O (input/output) bridge 707. I/O bridge 707 receives user input from one or more user input devices 708 (e.g., keyboard, mouse) and forwards the input to CPU 702 via bus 706 and memory bridge 705. Visual output is provided on a pixel based display device 710 (e.g., a conventional CRT or LCD based monitor) operating under control of a graphics subsystem 712 coupled to memory bridge 705 via a bus 713. A system disk 714 is also connected to I/O bridge 707. A switch 716 provides connections between I/O bridge 707 and other components such as a network adapter 718 and various add-in cards 720, 721. Other components (not explicitly shown), including USB or other port connections, CD drives, DVD drives, and the like, may also be connected to I/O bridge 707. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 712 includes a graphics processing unit (GPU) 722 and a graphics memory 724, which may be implemented, e.g., using one or more integrated circuit devices such as programmable processors, application specific integrated circuits (ASICs), and memory devices. GPU 722 may be configured to perform various tasks related to generating pixel data from graphics data supplied by CPU 702 and/or system memory 704 via memory bridge 705 and bus 713, interacting with graphics memory 724 to store and update pixel data, and the like. For example, GPU 722 may generate pixel data from 2-D or 3-D scene data provided by various programs executing on CPU 702. GPU 722 may also store pixel data received via memory bridge 705 to graphics memory 724 with or without further processing. GPU 722 also includes a scanout module configured to deliver pixel data from graphics memory 724 to display device 710. Furthermore, GPU 722 includes the cluster 200 having a core interface with several transpose buffers that reorganize data between hexadecimal form and quad form, in accordance with the present invention.

CPU 702 operates as the master processor of system 700, controlling and coordinating operations of other system components. In particular, CPU 702 issues commands that control the operation of GPU 722. In some embodiments, CPU 702 writes a stream of commands for GPU 722 to a command buffer, which may be in system memory 704, graphics memory 724, or another storage location accessible to both CPU 702 and GPU 722. GPU 722 reads the command stream from the command buffer and executes commands asynchronously with operation of CPU 702.

It will be appreciated that the system shown herein is illustrative and that variations and modifications are possible. The bus topology, including the number and arrangement of bridges, may be modified as desired. For instance, in some embodiments, system memory 704 is connected to CPU 702 directly rather than through a bridge, and other devices communicate with system memory 704 via memory bridge 705 and CPU 702. In other alternative topologies, graphics subsystem 712 is connected to I/O bridge 707 rather than to memory bridge 705. In still other embodiments, I/O bridge 707 and memory bridge 705 might be integrated into a single chip. The particular components shown herein are optional; for instance, any number of add-in cards or peripheral devices might be supported. In some embodiments, switch 716 is eliminated, and network adapter 718 and add-in cards 720, 721 connect directly to I/O bridge 707.

The connection of GPU 722 to the rest of system 700 may also be varied. In some embodiments, graphics system 712 is implemented as an add-in card that can be inserted into an expansion slot of system 700. In other embodiments, a GPU is integrated on a single chip with a bus bridge, such as memory bridge 705 or I/O bridge 707.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 713. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 8:
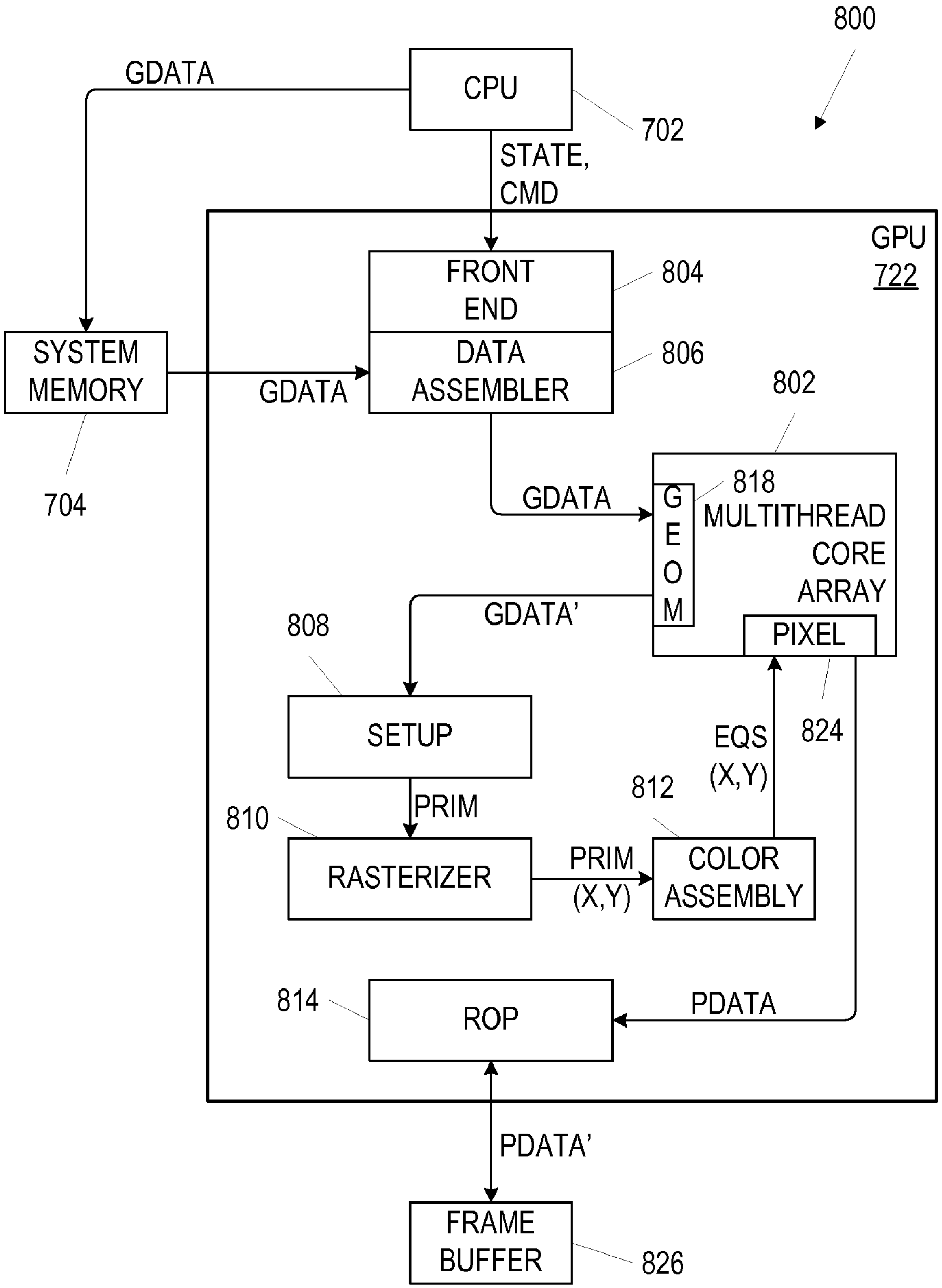
FIG. 8 is a block diagram of a rendering module 800 that can be implemented in GPU 722 of FIG. 7, which incorporates the core interface of FIG. 2, in accordance with an embodiment of the present invention.

FIG. 8 is a block diagram of a rendering pipeline 800 that can be implemented in GPU 722 of FIG. 7 according to an embodiment of the present invention. In this embodiment, rendering pipeline 800 is implemented using an architecture in which any applicable vertex shader programs, geometry shader programs, and pixel shader programs are executed using the same parallel-processing hardware, referred to herein as a "multithreaded core array" 802. Multithreaded core array 802 includes the cluster 200 having a core interface with several transpose buffers that reorganize data between hexadecimal form and quad form, in accordance with the present invention, and is described further below.

In addition to multithreaded core array 802, rendering pipeline 800 includes a front end 804 and data assembler 806, a setup module 808, a rasterizer 810, a color assembly module 812, and a raster operations module (ROP) 814, each of which can be implemented using conventional integrated circuit technologies or other technologies.

Front end 804 receives state information (STATE), rendering commands (CMD), and geometry data (GDATA), e.g., from CPU 702 of FIG. 7. In some embodiments, rather than providing geometry data directly, CPU 702 provides references to locations in system memory 704 at which geometry data is stored; data assembler 806 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 800. Front end 804 directs the state information and rendering commands via a control path (not explicitly shown) to other components of rendering pipeline 800. As is known in the art, these components may respond to received state information by storing or updating values in various control registers that are accessed during processing and may respond to rendering commands by processing data received in the pipeline.

Front end 804 directs the geometry data to data assembler 806. Data assembler 806 formats the geometry data and prepares it for delivery to a geometry module 818 in multithreaded core array 802.

Geometry module 818 directs programmable processing engines (not explicitly shown) in multithreaded core array 802 to execute vertex and/or geometry shader programs on the vertex data, with the programs being selected in response to the state information provided by front end 804. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 802 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3 D object coordinate system to a 3 D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 802. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 802.

After the vertex and/or geometry shader programs have executed, geometry module 818 passes the processed geometry data (GEOM') to setup module 808. Setup module 808, which may be of generally conventional design, generates edge equations from the clip space or screen space coordinates of each primitive; the edge equations are advantageously usable to determine whether a point in screen space is inside or outside the primitive.

Setup module 808 provides each primitive (PRIM) to rasterizer 810. Rasterizer 810, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 800 and might or might not be correlated with the screen resolution of a particular display device. As is known in the art, pixel color may be sampled at multiple locations within the pixel (e.g., using conventional super sampling or multisampling techniques), and in some embodiments, super sampling or multisampling is handled within the pixel shader.

After determining which pixels are covered by a primitive, rasterizer 810 provides the primitive (PRIM), along with a list of screen coordinates (X,Y) of the pixels covered by the primitive, to a color assembly module 812. Color assembly module 812 associates the primitives and coverage information received from rasterizer 810 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 812 generates coefficients A, B, and C for a plane equation of the form U=Ax+By+C for each attribute U.

Color assembly module 812 provides the attribute equations (EQS, which may include e.g., the plane-equation coefficients A, B and C for each primitive that covers at least one pixel and a list of screen coordinates (X,Y) of the covered pixels to a pixel module 824 in multithreaded core array 802. Pixel module 824 directs programmable processing engines (not explicitly shown) in multithreaded core array 802 to execute one or more pixel shader programs on each pixel covered by the primitive, with the program(s) being selected in response to the state information provided by front end

804. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 802 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 802 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 824 provides the processed pixels (PDATA) to ROP 814. ROP 814, which may be of generally conventional design, integrates the pixel values received from pixel module 824 with pixels of the image under construction in frame buffer 826, which may be located, e.g., in graphics memory 724. In some embodiments, ROP 814 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 826. Once the image is complete, frame buffer 826 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 824. In another embodiment, some operations conventionally performed by a ROP may be performed within pixel module 824 before the pixel data is forwarded to ROP 814.

Further, multiple instances of some or all of the modules described herein may be operated in parallel. In one such embodiment, multithreaded core array 802 includes two or more geometry modules 818 and an equal number of pixel modules 824 that operate in parallel. Each geometry module and pixel module jointly controls a different subset of the processing engines in multithreaded core array 802.

Figure 9:
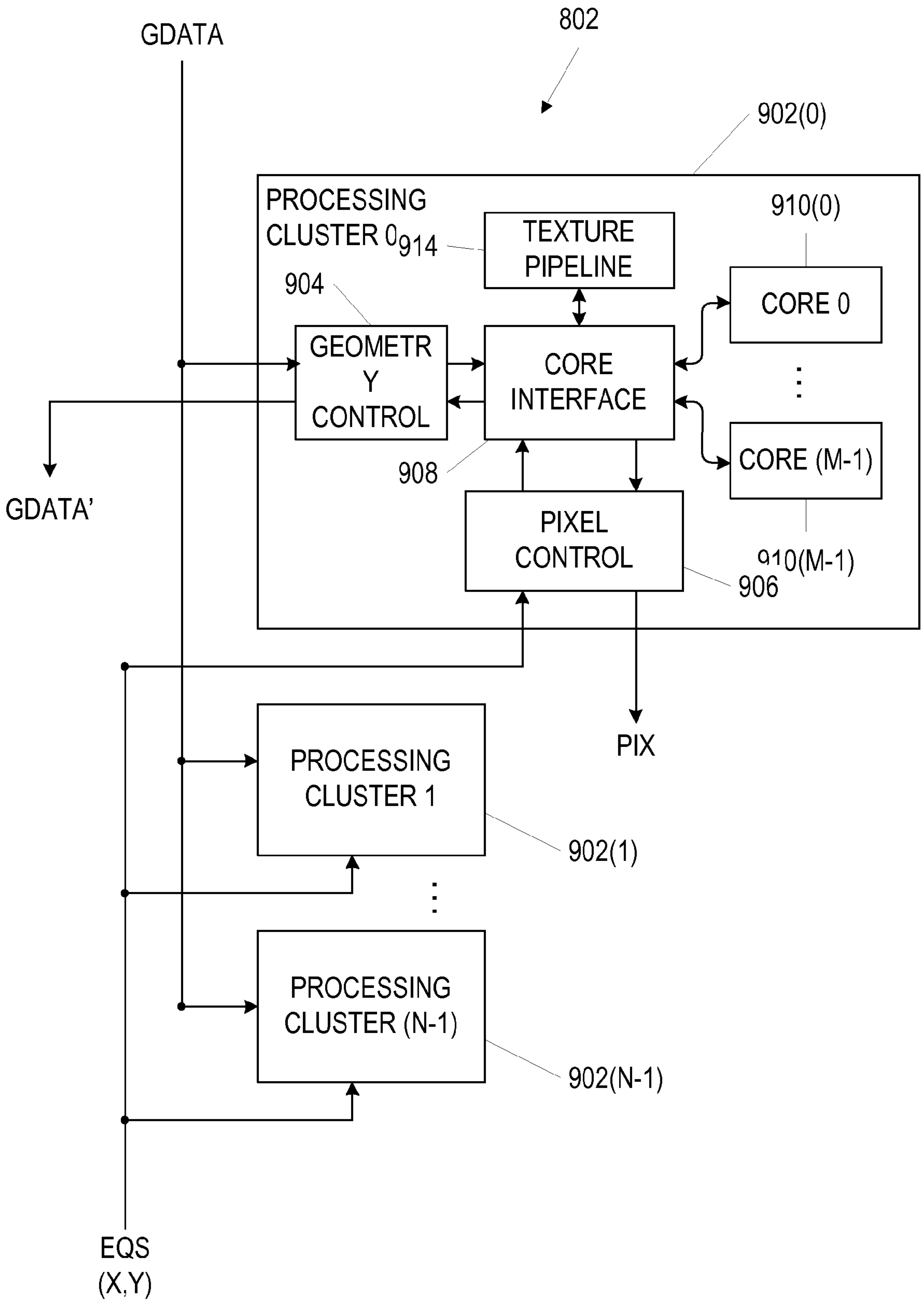
FIG. 9 is a block diagram of multithreaded core array 802, which incorporates the core interface of FIG. 2, in accordance with an embodiment of the present invention.

In one embodiment, multithreaded core array 802 provides a highly parallel architecture that supports concurrent execution of a large number of instances of vertex, geometry, and/or pixel shader programs in various combinations. FIG. 9 is a block diagram of multithreaded core array 802 according to an embodiment of the present invention.

In this embodiment, multithreaded core array 802 includes some number (N) of processing clusters 902. Herein, multiple instances of like objects are denoted with reference numbers identifying the object and parenthetical numbers identifying the instance where needed. Any number N (e.g., 1, 4, 8, or any other number) of processing clusters may be provided. In FIG. 9, one processing cluster 902 is shown in detail; it is to be understood that other processing clusters 902 can be of similar or identical design. The processing cluster 902, core interface 908 and other components used in this embodiment are similar to the cluster 200, core interface 215 and the other components described above with reference to FIG. 2 except that they have been configured for this embodiment.

Each processing cluster 902 includes a geometry controller 904 (implementing geometry module 818 of FIG. 8) and a pixel controller 906 (implementing pixel module 824 of FIG. 8). Geometry controller 904 and pixel controller 906 each communicate with a core interface 908. Core interface 908 controls a number (M) of cores 910 that include the processing engines of multithreaded core array 802. Any number M (e.g., 1, 2, 4 or any other number) of cores 910 may be connected to a single core interface. Each core 910 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads.

Core interface 908 also controls a texture module 914 that is shared among cores 910. Texture module 914, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 910 encounters a texture instruction in one of its threads, it provides the texture coordinates to texture module 914 via core interface 908. Texture module 914 processes the texture instruction and returns the result to the core 910 via core interface 908. Details of transferring texture instructions between core 910 and texture module 914 are described above with reference to FIGS. 2, 3, 5 and 6. Similarly, details of transferring data from the texture module to the core 910 are described above with reference to FIG. 4.

In operation, data assembler 806 (FIG. 8) provides geometry data GDATA to processing clusters 902. In one embodiment, data assembler 806 divides the incoming stream of geometry data into portions and selects, e.g., based on availability of execution resources, which of processing clusters 902 is to receive the next portion of the geometry data. That portion is delivered to geometry controller 904 in the selected processing cluster 902.

Geometry controller 904 forwards the received data to core interface 908, which loads the vertex data into a core 910, then instructs core 910 to launch the appropriate vertex shader program. Upon completion of the vertex shader program, core interface 908 signals geometry controller 904. If a geometry shader program is to be executed, geometry controller 904 instructs core interface 908 to launch the geometry shader program. In some embodiments, the processed vertex data is returned to geometry controller 904 upon completion of the vertex shader program, and geometry controller 904 instructs core interface 908 to reload the data before executing the geometry shader program. After completion of the vertex shader program and/or geometry shader program, geometry controller 904 provides the processed geometry data (GEOM') to setup module 808 of FIG. 8.

At the pixel stage, color assembly module 812 (FIG. 8) provides attribute equations EQS for a primitive and pixel coordinates (X,Y) of pixels covered by the primitive to processing clusters 902. In one embodiment, color assembly module 812 divides the incoming stream of coverage data into portions and selects, e.g., based on availability of execution resources, which of processing clusters 902 is to receive the next portion of the data. That portion is delivered to pixel controller 906 in the selected processing cluster 902.

Pixel controller 906 delivers the data to core interface 908, which loads the pixel data into a core 910, then instructs the core 910 to launch the pixel shader program. Where core 910 is multithreaded, pixel shader programs, geometry shader programs, and vertex shader programs can all be executed concurrently in the same core 910. Upon completion of the pixel shader program, core interface 908 delivers the processed pixel data to pixel controller 906, which forwards the pixel data PDATA to ROP unit 814 (FIG. 8).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 910(0) of each processing cluster. Such design choices may be driven by considerations of hardware size and complexity versus performance, as is known in the art. A shared texture module is also optional; in some embodiments, each core might have its own texture module or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Figure 10:
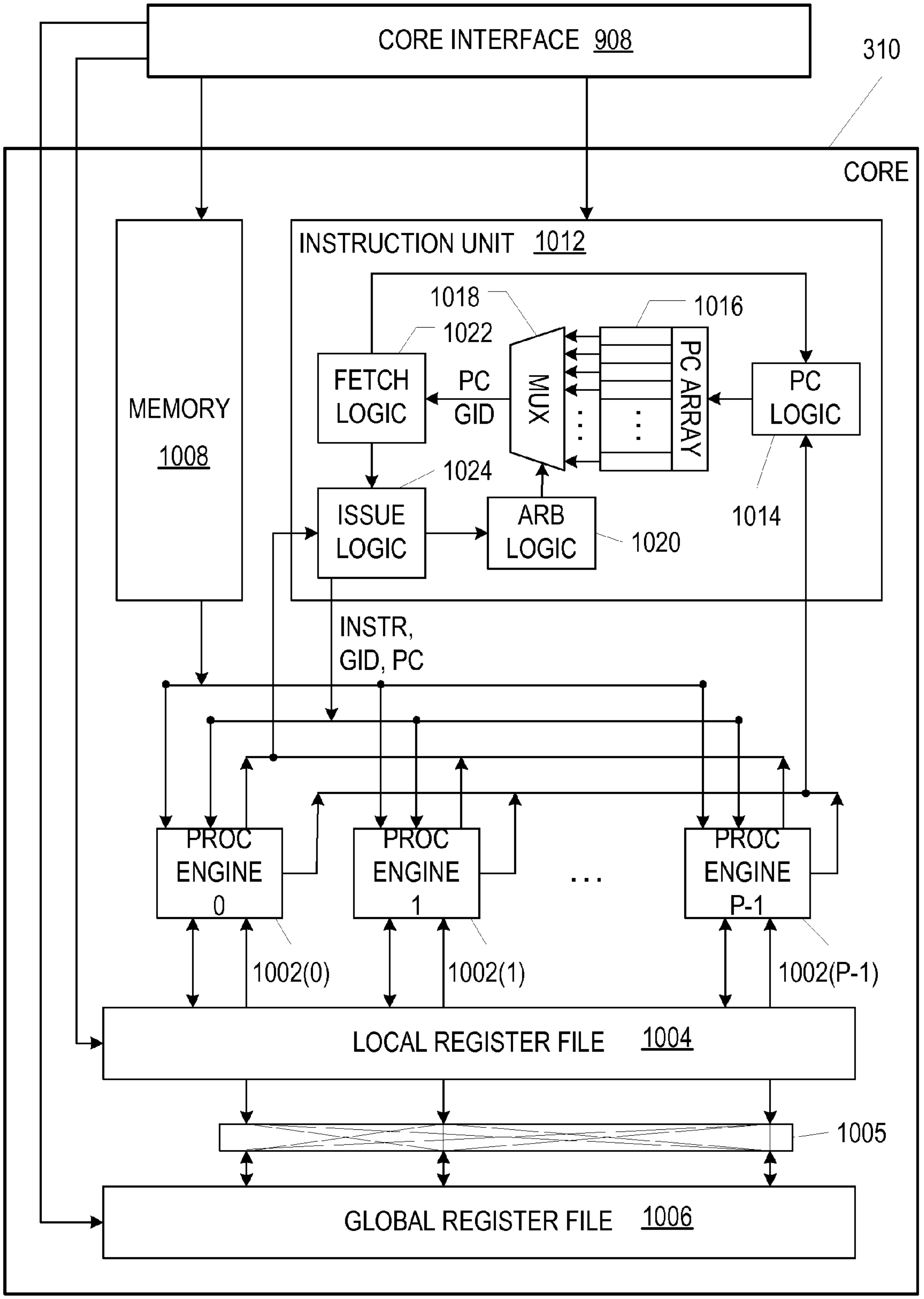
FIG. 10 is a block diagram of a core 810 according to an embodiment of the present invention.

FIG. 10 is a block diagram of a core 910 according to an embodiment of the present invention. Core 910 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 910 includes an array of P (e.g., 16) parallel processing engines 1002 configured to receive SIMD instructions from a single instruction unit 1012. Each parallel processing engine 1002 advantageously includes an identical set of functional units (e.g., arithmetic logic units, etc.). The functional units may be moduled, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 1002 is allocated space in a local register file 1004 for storing its local input data, intermediate results, and the like. In one embodiment, local register file 1004 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register file 1004 is advantageously large enough to support multiple concurrent threads per processing engine 1002.

Each processing engine 1002 also has access, via a crossbar switch 1005, to a global register file 1006 that is shared among all of the processing engines 1002 in core 910. Global register file 1006 may be as large as desired, and in some embodiments, any processing engine 1002 can read to or write from any location in global register file 1006. In addition to global register file 1006, some embodiments also provide an on-chip shared memory 1008, which may be implemented, e.g., as a conventional RAM. On-chip memory 1008 is advantageously used to store data that is expected to be used in multiple threads, such as coefficients of attribute equations, which are usable in pixel shader programs. In some embodiments, processing engines 1002 may also have access to additional off-chip shared memory (not shown), which might be located, e.g., within graphics memory 724 of FIG. 7.

In one embodiment, each processing engine 1002 is multithreaded and can execute up to some number G (e.g., 24) of threads concurrently, e.g., by maintaining current state information associated with each thread in a different portion of its allocated lane in local register file 1006. Processing engines 1002 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 1012 is configured such that, for any given processing cycle, the same instruction (INSTR) is issued to all P processing engines 1002. Thus, at the level of a single clock cycle, core 910 implements a P-way SIMD microarchitecture. Since each processing engine 1002 is also multithreaded, supporting up to G threads, core 910 in this embodiment can have up to P*G threads in flight concurrently. For instance, if P=16 and G=24, then core 910 supports up to 984 concurrent threads.

Because instruction unit 1012 issues the same instruction to all P processing engines 1002 in parallel, core 910 is advantageously used to process threads in "SIMD groups." As used herein, a "SIMD group" refers to a group of up to P threads of execution of the same program on different input data, with one thread of the group being assigned to each processing engine 1002. For example, a SIMD group might consist of P vertices, each being processed using the same vertex shader program. (A SIMD group may include fewer than P threads, in which case some of processing engines 1002 will be idle during cycles when that SIMD group is being processed.) Since each processing engine 1002 can support up to G threads, it follows that up to G SIMD groups can be in flight in core 910 at any given time.

On each clock cycle, one instruction is issued to all P threads making up a selected one of the G SIMD groups. To indicate which thread is currently active, a "group index" (GID) for the associated thread may be included with the instruction. Processing engine 1002 uses group index GID as a context identifier, e.g., to determine which portion of its allocated lane in local register file 1004 should be used when executing the instruction. Thus, in a given cycle, all processing engines 1002 in core 910 are nominally executing the same instruction for different threads in the same group.

It should be noted that although all threads within a group are executing the same program and are initially synchronized with each other, the execution paths of different threads in the group might diverge during the course of executing the program. For instance, a conditional branch in the program might be taken by some threads and not taken by others. Each processing engine 1002 advantageously maintains a local program counter (PC) value for each thread it is executing; if an instruction for a thread is received that does not match the local PC value for that thread, processing engine 1002 simply ignores the instruction (e.g., executing a no-op).

Instruction unit 1012 advantageously manages instruction fetch and issue for each SIMD group so as to ensure that threads in a group that have diverged eventually resynchronize. In one embodiment, instruction unit 1012 includes program counter (PC) logic 1014, a program counter register array 1016, a multiplexer 1018, arbitration logic 1020, fetch logic 1022, and issue logic 1024. Program counter register array 1016 stores G program counter values (one per SIMD group), which are updated independently of each other by PC logic 1014. PC logic 1014 updates the PC values based on information received from processing engines 1002 and/or fetch logic 1022. PC logic 1014 is advantageously configured to track divergence among threads in a SIMD group and to select instructions in a way that ultimately results in the threads resynchronizing.

Fetch logic 1022, which may be of generally conventional design, is configured to fetch an instruction corresponding to a program counter value PC from an instruction store (not shown) and to provide the fetched instructions to issue logic 1024. In some embodiments, fetch logic 1022 (or issue logic 1024) may also include decoding logic that converts the instructions into a format recognizable by processing engines 1002.

Arbitration logic 1020 and multiplexer 1018 determine the order in which instructions are fetched. More specifically, on each clock cycle, arbitration logic 1020 selects one of the G possible group indices GID as the SIMD group for which a next instruction should be fetched and supplies a corresponding control signal to multiplexer 1018, which selects the corresponding PC. Arbitration logic 1020 may include conventional logic for prioritizing and selecting among concurrent threads (e.g., using round-robin, least-recently serviced, or the like), and selection may be based in part on feedback information from fetch logic 1022 or issue logic 1024 as to how many instructions have been fetched but not yet issued for each SIMD group.

Fetch logic 1022 provides the fetched instructions, together with the group index GID and program counter value PC, to issue logic 1024. In some embodiments, issue logic 1024 maintains a queue of fetched instructions for each in-flight SIMD group. Issue logic 1024, which may be of generally conventional design, receives status information from processing engines 1002 indicating which SIMD groups are ready to execute a next instruction. Based on this information, issue logic 1024 selects a next instruction to issue and issues the selected instruction, together with the associated PC value and GID. Each processing engine 1002 either executes or ignores the instruction, depending on whether the PC value corresponds to the next instruction in its thread associated with group index GID.

In one embodiment, instructions within a SIMD group are issued in order relative to each other, but the next instruction to be issued can be associated with any one of the SIMD groups. For instance, if in the context of one SIMD group, one or more processing engines 1002 are waiting for a response from other system components (e.g., off-chip memory or texture module 914 of FIG. 9), issue logic 1024 advantageously selects a group index GID corresponding to a different SIMD group.

For optimal performance, all threads within a SIMD group are advantageously launched on the same clock cycle so that they begin in a synchronized state. In one embodiment, core interface 908 advantageously loads a SIMD group into core 910, then instructs core 910 to launch the group. "Loading" a group includes supplying instruction unit 1012 and processing engines 1002 with input data and other parameters required to execute the applicable program. For example, in the case of vertex processing, core interface 908 loads the starting PC value for the vertex shader program into a slot in PC array 1016 that is not currently in use; this slot corresponds to the group index GID assigned to the new SIMD group that will process vertex threads. Core interface 908 allocates sufficient space in the local register file for each processing engine 1002 to execute one vertex thread then loads the vertex data. In one embodiment, all data for the first vertex in the group is loaded into the lane of local register file 1004 allocated to processing engine 1002(0), all data for the second vertex is in the lane of local register file 1004 allocated to processing engine 1002(1), and so on. In some embodiments, data for multiple vertices in the group can be loaded in parallel.

Once all the data for the group has been loaded, core interface 908 launches the SIMD group by signaling to instruction unit 1012 to begin fetching and issuing instructions corresponding to the group index GID of the new group. SIMD groups for geometry and pixel threads can be loaded and launched in a similar fashion.

It will be appreciated that the core architecture described herein is illustrative and that variations and modifications are possible. Any number of processing units may be included. In some embodiments, each processing unit has its own local register file, and the allocation of local register file entries per thread can be fixed or configurable as desired.

In some embodiments, core 910 is operated at a higher clock rate than allowing the streaming processor to process more data using less hardware in a given amount of time. For instance, core 910 can be operated at a clock rate that is twice the clock rate of core interface 908. If core 910 includes P processing engines 1002 producing data at twice the core interface clock rate, then core 910 can produce 2*P results per core interface clock. Provided there is sufficient space in local register file 1004, from the perspective of core interface 908, the situation is effectively identical to a core with 2*P processing units. Thus, P-way SIMD parallelism could be produced either by including P processing units in core 910 and operating core 910 at the same clock rate as core interface 908 or by including P/2 processing units in core 910 and operating core 910 at twice the clock rate of core interface 908. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 1024 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

What is claimed is:

1. A graphics processing unit, comprising:

a core configured to process texture image data in 32 bit per component format;

a graphics module configured to process said texture image data in 16 bits per component format;

a core interface coupled to both said core and said graphics module, said core interface further comprising a transpose buffer configurable to receive from said core said texture image data in 32 bit per component format and output to said graphics module said received texture image data in 16 bits per component format;

where said core interface is configurable to receive said texture image data at a speed and to transmit said texture image data at half of said speed.

2. The system of claim 1 where said core interface is further configurable to transmit said texture image data at two components per quad per clock cycle.

3. The graphics processing unit of claim 1 where said transpose buffer comprises two memory banks that are coupled to store all of the data.

4. A method for processing data in a system having a texture module optimized to process data in 32 bit per component format and a graphics module optimized to process data in 16 bit per component format, comprising:

providing data from said texture module to a transpose buffer in 32 bit per component format at a first speed;

storing said received data in 32 bit per component format in a plurality of banks of said transpose buffer; and outputting said received data in 16 bits per component format from said transpose buffer to a graphics module at said first speed.

5. The method of claim 4 wherein said data is provided from said texture module to said transpose buffer at two components per quad per clock cycle.

6. The method of claim 4 wherein said storing said received data in 32 bit per component format further comprises storing said received data in two memory banks that are coupled to store all of the data.

7. The method of claim 6 wherein each of said two memory banks holds one 16-bit half of said received data in 32 bit per component format.

8. The method of claim 4 wherein said first speed is half of the speed at which data is provided from said texture module to said transpose buffer in 16 bit per component format.

* * * * *